(12) United States Patent
Inoue

(10) Patent No.: US 6,170,909 B1
(45) Date of Patent: Jan. 9, 2001

(54) TABLE APPARATUS

(75) Inventor: Kazuyoshi Inoue, Kanagawa-ken (JP)

(73) Assignee: Nissan Motor Co., Ltd., Kanagawa-Ken (JP)

( * ) Notice: Under 35 U.S.C. 154(b), the term of this patent shall be extended for 0 days.

(21) Appl. No.: 09/369,429

(22) Filed: Aug. 6, 1999

(30) Foreign Application Priority Data

Aug. 11, 1998 (JP) .................................................. 10-227267

(51) Int. Cl.$^7$ .................................................. A47B 83/00
(52) U.S. Cl. ............................................. 297/163; 211/99
(58) Field of Search .............................. 297/163, 188.05, 297/188.04; 108/26, 50.11; 211/99, 104, 149

(56) References Cited

U.S. PATENT DOCUMENTS

| | | | |
|---|---|---|---|
| 342,954 | * | 6/1886 | Ertell ........................................ 211/99 |
| 607,683 | * | 7/1898 | Downer ................................... 211/99 |
| 687,133 | * | 11/1901 | Denning ................................. 211/99 |
| 781,254 | * | 1/1905 | Whitney .................................. 211/99 |
| 1,245,425 | * | 11/1917 | Becker .............................. 211/104 X |
| 5,092,652 | * | 3/1992 | Macaluso ........................ 297/163 X |
| 5,863,092 | * | 1/1999 | Kifer ................................. 297/188.04 |

FOREIGN PATENT DOCUMENTS

| | | | |
|---|---|---|---|
| 0071817 | * | 2/1983 | (EP) ..................................... 297/163 |
| 316768 | * | 4/1929 | (GB) ...................................... 211/99 |
| 405278510 | * | 10/1993 | (JP) ..................................... 297/163 |
| 7-112643 | | 5/1995 | (JP) . |
| 325387 | * | 6/1970 | (SE) ................................. 297/188.05 |

* cited by examiner

Primary Examiner—Peter M. Cuomo
Assistant Examiner—David E. Allred
(74) Attorney, Agent, or Firm—McDermott, Will & Emery

(57) ABSTRACT

A table for holding food and a container in a vehicle is swingably supported from the rear of a supporting member. A hook that is provided for the hanging of objects from the table is disposed so as to hang down from the region of the hole when the table is in a substantially horizontal usage position, and to be automatically stored within the hole when the table is in a storage position along the rear surface of the supporting member.

8 Claims, 3 Drawing Sheets

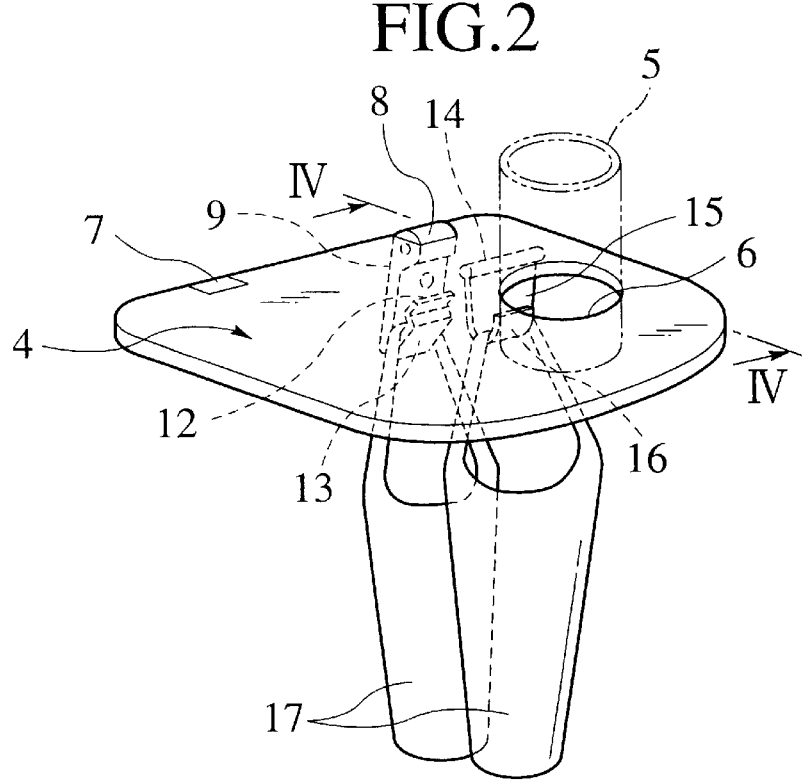
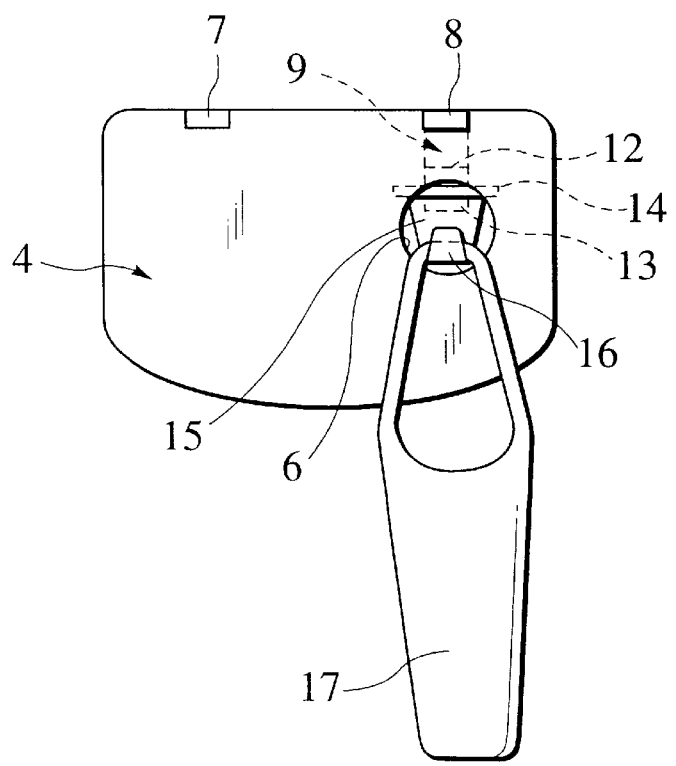

TABLE APPARATUS

The content of Application No. TOKUGANHEI 10-227267 which was filed in Japan on Aug. 11, 1998 and on which the claim to priority for this application is based, is hereby incorporated by reference.

BACKGROUND OF THE INVENTION

1. Field of the Invention

The present invention relates to a table apparatus, and more particularly to a table apparatus that is mounted to a support member so as to enable it to be folded away.

2. Description of the Related Art

There are known example of the installation of a table in a vehicle, the table having an upper surface onto which food or the like is placed and a hole for holding a tapered container, and similar technology is disclosed in the Japanese Patent Laid-Open Application H7-112643.

SUMMARY OF THE INVENTION

Recently, there has been a desire to have not only a foldable table on the rear of a seat, but also to provide the table with a movable hook for the purpose of supporting, for example, a bag with a gripping hole or loop.

If the above-noted hook is mounted on the upper surface of the table, however, although the hook can be used when the table is in the storage condition, it is not possible to use the hook when the table is being used, and the upper surface area of the table is made narrow to the extent of the space occupied by the movable hook. If the movable hook is mounted to the lower surface of the table, although it is possible to achieve a wide area on the upper surface, it is not possible to use the hook when the table is in the stored condition. Additionally, if the movable hook is mounted to the periphery of the table, because a bag hung on the movable hook is positioned at the periphery of the table, in addition to it providing a nuisance, this arrangement subjects the hinge of the table to a large load.

Accordingly, it is an object of the present invention to provide a table apparatus that improves on the above-noted drawback in the related art, which enables use of the movable hook whether the table is being used or is stored, thereby enabling a large area to be used on the upper surface thereof, and avoiding the problem of having the object hung on the hook be a nuisance and the problem of a large load on the hinge of the table.

To achieve the above-noted object, a table apparatus according to the present invention has a table, in which is formed a hole for the purpose of supporting a container, a first hinge, a movable hook, and a second hinge. The first hinge is fixed to the rear surface of a supporting member, and rotatably supports the table at one end thereof. The table can be freely swung about the first hinge as a turning center between a storage position along the rear surface of the supporting member and a usage position, which is upright with respect to the rear surface of the supporting member. The movable hook has a grasping part. The second hinge is mounted to the lower surface of the table and supports the movable hook so as to permit the movable hook to swing about its supported end. The second hinge is disposed between the hole of the table and the first hinge. When the table is in the storage position, the grasping part of the movable hook is disposed within the hole thereof.

According to the above arrangement, because the movable hook is disposed at the lower surface of the table, when the table is in usage position, the movable hook can be used, and it is possible to achieve a large usable area on the upper surface of the table.

When the table is in the storage position, the grasping part of the movable hook is positioned within the hole of the table and is exposed, so that it is possible to use the movable hook even when the table is in the storage position.

Additionally, because the movable hook is disposed between hole of the table and the first hinge, an object that is hung from the movable hook is in proximity to the supporting member, and does not present a nuisance to the user of the table. Because the distance between the movable hook and the first hinge can be made short, it is possible to reduce the load placed on the first hinge by the object hung on the movable hook to a small load.

BRIEF DESCRIPTION OF THE DRAWINGS

FIG. 2 is a perspective view that shows the table in use.

FIG. 3 is a perspective view that shows the table in the stored condition.

DESCRIPTION OF THE PREFERRED EMBODIMENTS

Figure 1:
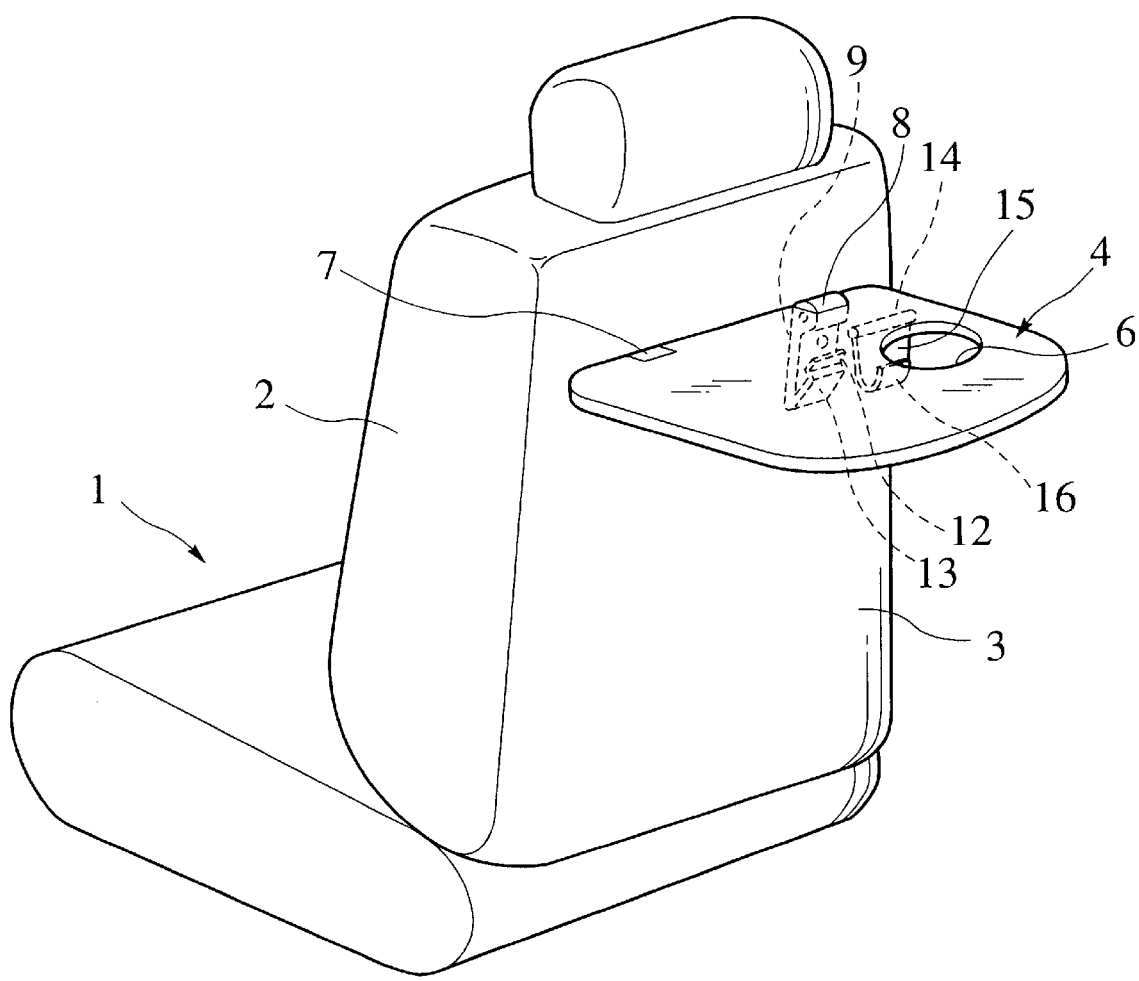
FIG. 1 is a perspective view that shows the first embodiment of a table apparatus according to the present invention.
Figure 4:
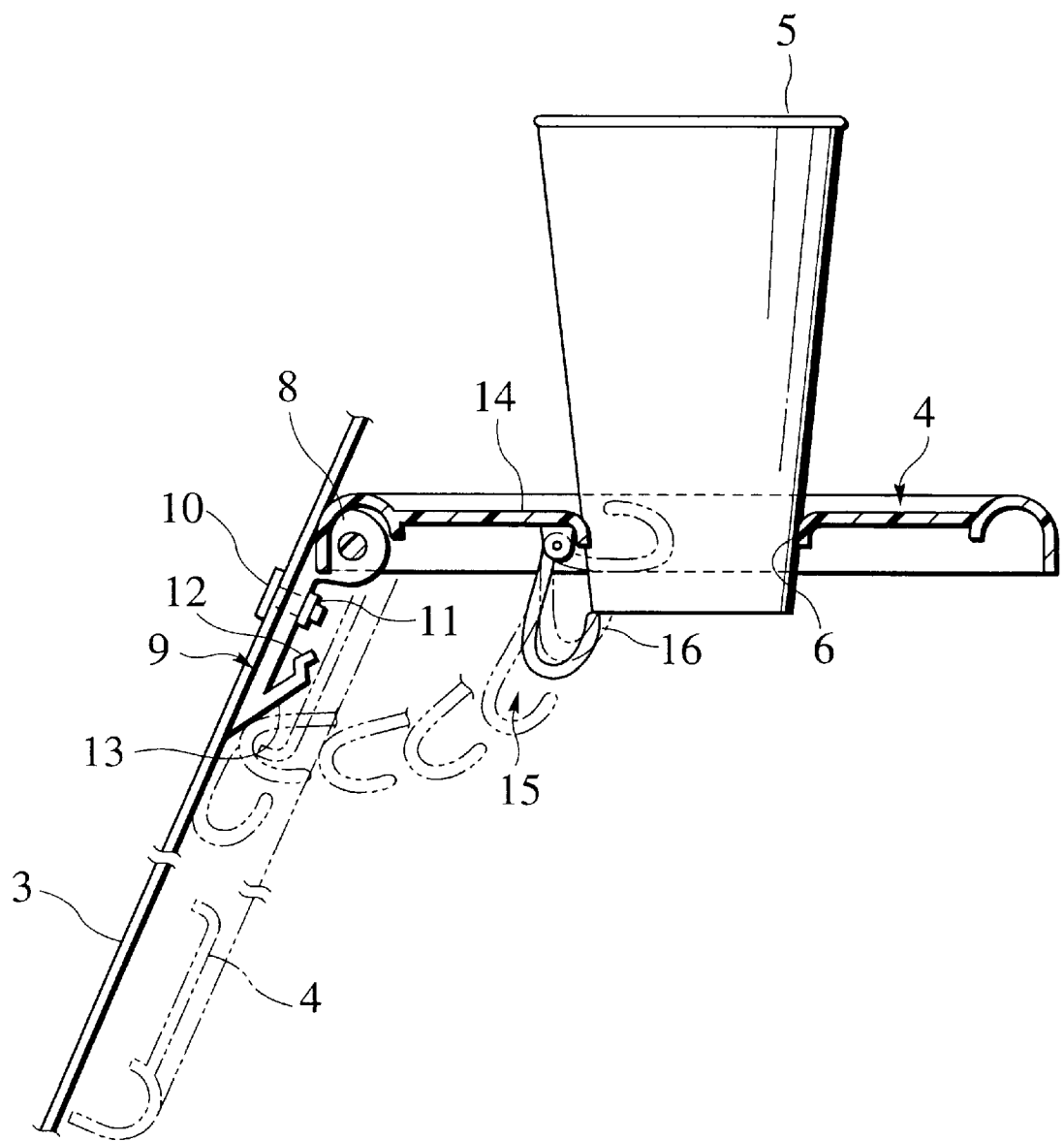
FIG. 4 is a cross-section view of the table of FIG. 2, taken along the cutting line IV—IV.

A preferred embodiment of the present invention is described in detail below, with reference to FIG. 1 through FIG. 4.

In the above-noted drawings, the reference numeral 1 denotes a front seat in a vehicle. A table 4 is mounted to the back panel 3 that forms the rear surface of the seat back 2. In this embodiment, therefore, the seat back 2 corresponds to the supporting member. The table 4 is molded of resin, and has formed in its right part a hole 6, for the purpose of holding a tapered container 5. The table 4 it swingably mounted to the back panel 3 by means of a pair of first hinges 7 and 8 at the right and left of one end of the table, enabling the table 4 to be swung from the storage position along the back panel 3 to the substantially horizontal usage position. The table 4 is maintained in the horizontal usage position by a locking mechanism (not shown in the drawing). A prescribed friction is imparted to the right and left first hinges 7 and 8 so that the table 4 does not exhibit looseness, even if vibration is applied thereto.

Of the right and left first hinges 7 and 8, the right-side hinge 8 is formed by the upper end of a fixed hook 9 that is mounted to the back panel 3. This fixed hook 9 is mounted by means of a welded bolt 10 that is provided on the back panel 3 and a nut 11 that is tightened onto this welded bolt 10, an inclined upward-pointing grasping part 12 being formed on the bottom end thereof. The surface of this grasping part 12 makes a prescribed angle with respect to the back panel 3, and forms a guide surface 13 that is continuous with the surface of the back panel 3. Because the first hinge 8 is formed at the upper end part of the fixed hook 9, compared to the case in which this is provided separately, it is possible to reduce the number of parts. Additionally, because the guide surface 13 is continuous with the surface of the back panel 3, the formation of this guide surface 13 provides re-inforcement of the grasping part 12 of the fixed hook 9.

A movable hook 15 is provided at the hinge 8 side on the lower surface of the table 4, this being swingably supported by a second hinge 14. When the table 4 is in the folded away (storage) position along the surface this movable hook 15 the grasping part 16 of the movable hook 15 is positioned within the holding hole 6. In this condition, the free end of the grasping part 16 of the movable hook 15 protrudes slightly from the upper surface of the table 4, so that from the holding hole 6 it faces the outside from the folded condition. This movable hook 15 has a prescribed amount of friction imparted at the second hinge 14, so that it stops at the position in which it is swung to, and also so that it is not loose, even if subjected to vibration.

Next, the operation of the table 4 will be described. By pulling up and out the table 4 to the horizontal position and locking the table 4, it is not only possible to hold a tapered contained within the holding hole 6, but also to rest food and the like on the upper surface of the table 4. It is possible to hang on and support a bag by the grasping parts 16 and 12 of the movable hook 15 and fixed hook 9. Because the movable hook 15 is disposed at the side of the first hinge 8 from the holding hole 6, even with a bag 17 hanging on the movable hook 15, the bag is not a nuisance to a passenger in a rear seat. Additionally, because the movable hook 15 is close to the first hinges 7 and 8, the torsional moment placed on the hinges 7 and 8 is reduced, so that the load on the first hinges 7 and 8 is small.

When the table 4 is to be placed in the storage condition, after removing the container 5 and the bag 17, it is only necessary to swing the table 4 toward the back panel 3. That is, the movable hook 15 that had been pulled out by the hanging of the bag 17 thereonto makes contact with the guide surface 13 of the fixed hook 9 in the process of storing the table 4, thereby being automatically folded along the lower surface of the table 4, so that it is only necessary to swing the table 4 toward the back panel 3 in order to properly store the table 4.

When the table 4 is placed in the stored condition, the grasping part 16 of the movable hook 15 is positioned within the holding hole 6 of the table 4 and the free end of the grasping part 16 thereof protrudes from the holding hole 6, so that it is possible to hang a bag 17 from the grasping part 17 that is positioned within the holding hole 6. In this embodiment of the present invention, therefore, it is possible to hang a bag 17 from the movable hook 15 with the table in either the usage condition or the storage condition.

Although the above-noted embodiment is for the case of a seat of a vehicle, the present invention is not restricted to that application and can, of course, be applied to seats in theatres, and to other cases in which there is a vertical wall (such as the side trim in a vehicle) to which the table can be foldably supported.

What is claimed is:

1. A table apparatus comprising:

a table into which is formed a hole for holding a container;

a first hinge, which is fixed to a rear surface of a supporting member, and which swingably supports the table at one end, enabling the table to swing downwardly about the first hinge as a turning center from a usage position to between a storage position along the rear surface of the supporting member which is upright;

a movable hook that has a grasping part;

a second hinge, which is fixed to a lower surface of the table, and which rotatably supports the movable hook, the second hinge being disposed between the hole and the first hinge, so that when the table is in the storage position, the grasping part is positioned within the holding hole.

2. A table apparatus according to claim 1, wherein the second hinge is proximate to the hole.

3. A table apparatus according to claim 1, wherein the table is substantially horizontal when in the usage position.

4. A table apparatus according to claim 1 further comprising a guide surface, disposed on the rear surface of the supporting member, which, as the table is swung toward the storage position, guides the movable hook into the hole.

5. A table apparatus according to claim 1 further comprising:

a fixed hook that is fixed to the rear surface of the supporting member, the fixed hook comprising a guide surface which, as the table is swung toward the storage position, guides the movable hook into the hole.

6. A table apparatus according to claim 5, wherein the fixed hook comprises the first hinge.

7. A table apparatus according to claim 1, further comprising a fixed hook that is fixed to the rear surface of the supporting member, the fixed hook comprising the first hinge.

8. A table apparatus according to claim 1, wherein the supporting member is a seat back of a vehicle.

* * * * *